UNITED STATES PATENT OFFICE.

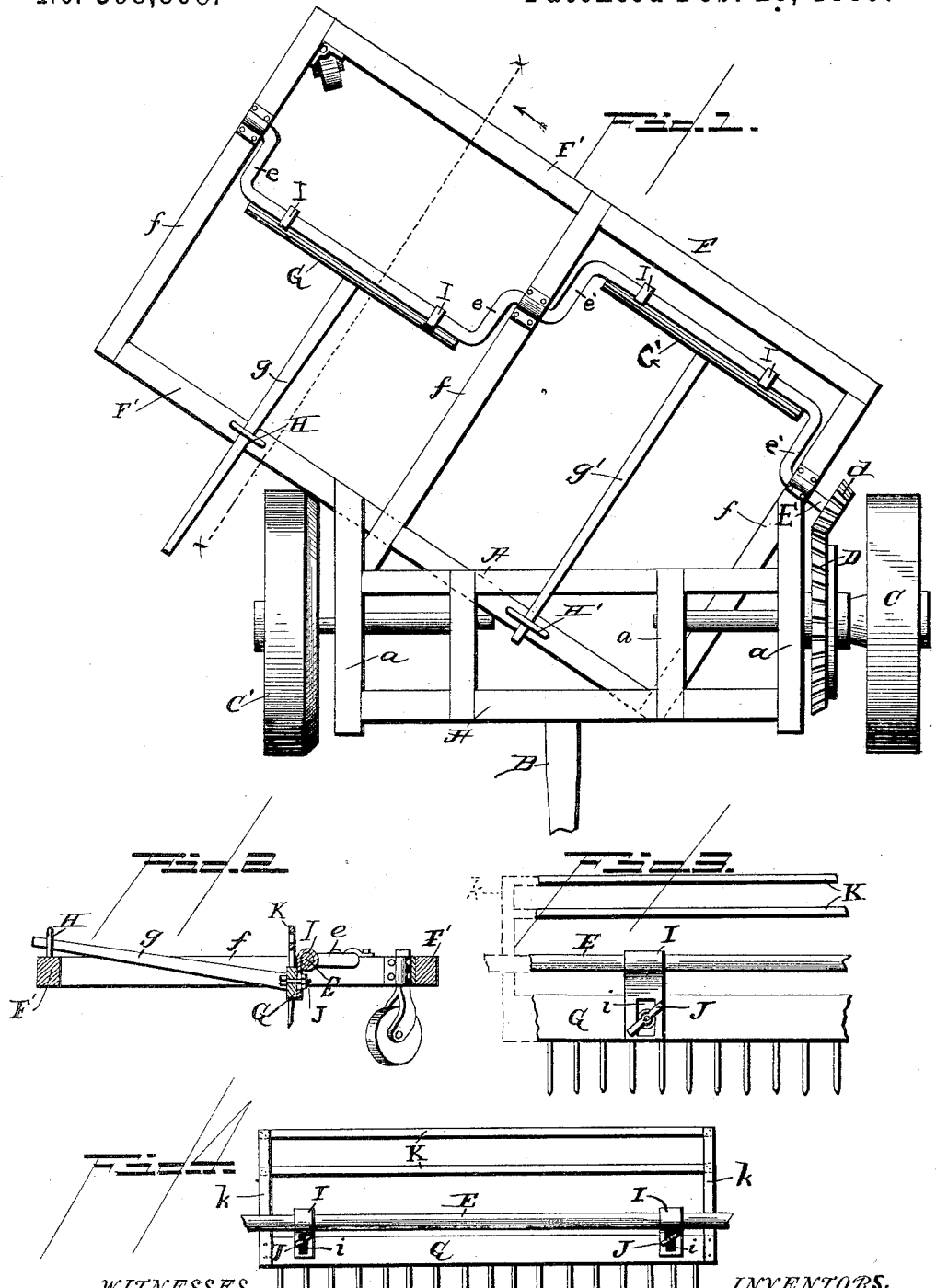

ELWOOD TUSH AND JACOB B. ENGSTROM, OF MANCHESTER, IOWA; SAID TUSH ASSIGNOR TO SAID ENGSTROM.

HORSE HAY-RAKE.

SPECIFICATION forming part of Letters Patent No. 398,808, dated February 26, 1889.

Application filed August 20, 1888. Serial No. 283,208. (No model.)

*To all whom it may concern:*

Be it known that we, ELWOOD TUSH and JACOB B. ENGSTROM, citizens of the United States, residing at Manchester, in the county of Delaware and State of Iowa, have invented certain new and useful Improvements in Horse Hay-Rakes; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to horse hay-rakes, and has for its object the invention of a rake that will be simple, cheap, and efficient, and which will gather hay the width of the machine and deliver it in a row at one side of the said machine.

The improvement consists of the novel features which hereinafter will be more fully described and claimed, and shown in the annexed drawings, in which—

Figure 1 is a plan view of the machine; Fig. 2, a section on the line X X of Fig. 1, looking in the direction of the arrow; Fig. 3, a rear detail view showing the manner of adjustably connecting the rake with the crank-shaft, and Fig. 4 a rear view of the rakes.

The main frame, composed of the longitudinal beams A A and the side and intermediate bars, $a$ $a$, is provided with the tongue B and with wheels C and C'. The wheel C is provided with the gear-wheel D, which revolves therewith and which meshes with the pinion $d$ on the crank-shaft E. The rake-frame F, composed of the beams F' and the side and intermediate bars, $f$, and set at an oblique angle to the draft of the machine, is secured at its front corner to the front bar of the main frame and is braced at its middle by the intermediate cross-bar, $f$, which extends parallel with the end bars of the frame and from the front bar to the rear bar thereof, and is secured to the main frame at its front end, which end projects in front of the front bar of the said rake-frame.

The crank-shaft is journaled at its ends in the end or side bars of the frame F and midway of its ends in the cross-bar $f$. The two sets of cranks $e$ and $e'$ extend in diametrically-opposite directions to counterbalance one another.

The rakes G and G' are suspended directly from the straight portions of the shaft E, between the cranks $e$ and $e'$, respectively, and are adjustably connected with the said portions by the strap-bearings I, which are journaled on the said portions, and have their lower ends provided with slots $i$, through which set-screws J pass and enter the rake-heads. By loosening the set-screws J the rakes can be adjusted to and from the respective portions to raise or lower the rakes, as may be required. The rakes are each provided with a guard, which extends up vertically therefrom to prevent the hay being carried over the top of the rakes. Each guard is composed of end vertical slats, $k$, and cross-slats K, the end slats being secured to the rake-head and the cross-slats secured at their ends to the end slats, substantially as shown.

The rods $g$ and $g'$, projecting from the rakes, work through guides H and H', respectively, on the rake-frame and hold the teeth of the rakes in an approximately-vertical position. The rakes, being arranged on diametrically-opposite sides of the axis of the crank-shaft, counterbalance each other, so that the power is expended to the best possible advantage.

As the machine is drawn over the field, the crank-shaft is set in motion from the drive-wheel C through gear-wheel D and pinion $d$, and effects movement of the rakes, which are carried around in a circle by the cranks and which are vibrated or turned on the straight portions by the rods $g$ and $g'$, which work through the guides H and H'. The rakes move alternately in reverse directions—that is, as the one is advancing the other is receding.

Having thus described our invention, what we claim, and desire to secure by Letters Patent, is—

1. The herein-described horse hay-rake, composed of the main frame, the wheels, the gear-wheel D, connected with one of the wheels, the rake-frame having middle cross-bar and set at an oblique angle to the draft of the machine and connected at one front corner with the main frame, the crank-shaft journaled at its ends and midway of its ends in the rake-frame and having one end extended and provided with a pinion which meshes with the said gear-wheel, the rakes adjustably suspended from the straight portions of the crank-shaft and having vertical guards, and the rods extended from the rakes and working through guides on the said frame, substantially as described, for the purpose specified.

2. In a horse hay-rake, the combination, with the crank-shaft, of the vertical suspended rake having a vertical guard, and the bearings on the shaft adjustably connecting the rake with the crank-shaft, substantially as described.

In testimony whereof we affix our signatures in presence of two witnesses.

ELWOOD TUSH.
JACOB B. ENGSTROM.

Witnesses:
A. B. TERRIL,
A. O. STANGER.